(12) United States Patent
Takai

(10) Patent No.: US 11,192,789 B2
(45) Date of Patent: Dec. 7, 2021

(54) FIBROUS CARBON NANOSTRUCTURE DISPERSION LIQUID, METHOD OF PRODUCING SAME, AND FIBROUS CARBON NANOSTRUCTURE

(71) Applicant: ZEON CORPORATION, Tokyo (JP)

(72) Inventor: Hirokazu Takai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 238 days.

(21) Appl. No.: 16/490,674

(22) PCT Filed: Mar. 22, 2018

(86) PCT No.: PCT/JP2018/011452
§ 371 (c)(1),
(2) Date: Sep. 3, 2019

(87) PCT Pub. No.: WO2018/180901
PCT Pub. Date: Oct. 4, 2018

(65) Prior Publication Data
US 2019/0389728 A1    Dec. 26, 2019

(30) Foreign Application Priority Data
Mar. 30, 2017   (JP) .............................. JP2017-068805

(51) Int. Cl.
*C01B 32/174*   (2017.01)
*B82Y 30/00*    (2011.01)
*B82Y 40/00*    (2011.01)

(52) U.S. Cl.
CPC .............. *C01B 32/174* (2017.08); *B82Y 30/00* (2013.01); *B82Y 40/00* (2013.01); *C01B 2202/02* (2013.01); *C01B 2202/06* (2013.01); *C01P 2002/89* (2013.01); *C01P 2004/13* (2013.01); *C01P 2006/12* (2013.01)

(58) Field of Classification Search
CPC .............. C01B 32/174; C01B 2202/02; C01B 2202/06; C01B 2202/30; C01B 2202/32; C01B 32/158; C01B 32/159; C01B 32/16; C01B 32/162; C01B 32/164; C01B 32/166; C01B 32/168; C01B 32/17; C01B 32/172; C01B 32/176; C01B 32/178; C01B 2202/00; C01B 2202/04; C01B 2202/08; C01B 2202/10; C01B 2202/20; C01B 2202/22; C01B 2202/24; C01B 2202/26; C01B 2202/28; C01B 2202/34; C01B 2202/36; B82Y 30/00; B82Y 40/00; C01P 2002/89; C01P 2004/13; C01P 2006/12
See application file for complete search history.

(56) References Cited

U.S. PATENT DOCUMENTS

| 7,556,746 B2 | 7/2009 | Sen et al. |
|---|---|---|
| 7,854,991 B2 | 12/2010 | Hata et al. |
| 2006/0041050 A1 | 2/2006 | Manane et al. |
| 2010/0317820 A1* | 12/2010 | Khabashesku ........ C01B 32/174 528/60 |
| 2013/0030217 A1 | 1/2013 | Maeda et al. |

FOREIGN PATENT DOCUMENTS

| JP | 4621896 B2 | 1/2011 |
|---|---|---|
| WO | 2004058899 A1 | 7/2004 |
| WO | 2011096342 A1 | 8/2011 |

OTHER PUBLICATIONS

Khabashesku, et al., Covalent functionalization of carbon nanotubes: synthesis, properties and applications of fluorinated derivatives, Russian Chemical Reviews 2011; 80: 705-725 (Year: 2011).*
Jun. 5, 2018, International Search Report issued in the International Patent Application No. PCT/JP2018/011452.
Oct. 1, 2019, International Preliminary Report on Patentability issued in the International Patent Application No. PCT/JP2018/011452.

* cited by examiner

*Primary Examiner* — Daniel C. McCracken
(74) *Attorney, Agent, or Firm* — Kenja IP Law PC

(57) ABSTRACT

A fibrous carbon nanostructure dispersion liquid contains a solvent and fibrous carbon nanostructures having at least one absorption peak in a wavenumber region of 500 $cm^{-1}$ to 600 $cm^{-1}$ in a light absorption spectrum.

8 Claims, 1 Drawing Sheet

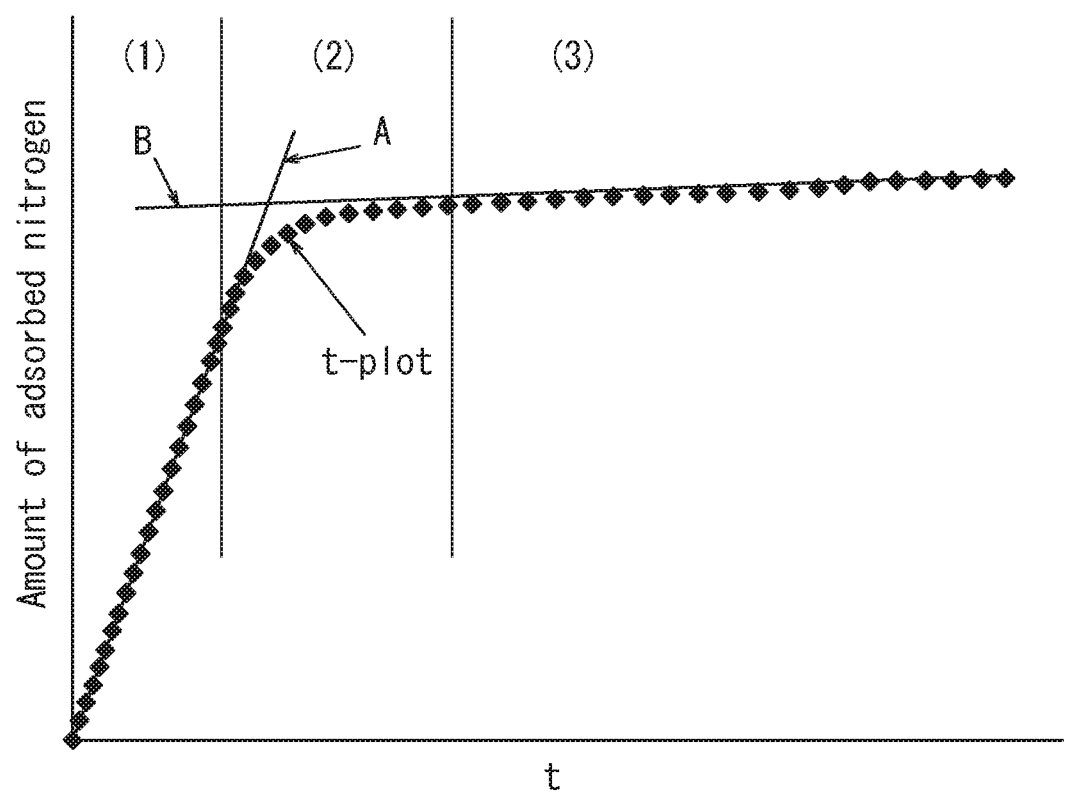

FIBROUS CARBON NANOSTRUCTURE DISPERSION LIQUID, METHOD OF PRODUCING SAME, AND FIBROUS CARBON NANOSTRUCTURE

TECHNICAL FIELD

The present disclosure relates to a fibrous carbon nanostructure dispersion liquid, a method of producing the fibrous carbon nanostructure dispersion liquid, and a fibrous carbon nanostructure.

BACKGROUND

Fibrous carbon materials, and particularly fibrous carbon nanostructures such as carbon nanotubes (hereinafter, also referred to as "CNTs"), have been attracting interest in recent years as materials having excellent electrical conductivity, thermal conductivity, and mechanical properties.

However, fibrous carbon nanostructures such as CNTs are fine structures having nanometer-size diameters, which makes handling and processing of individual nanostructures difficult. For this reason, it has been proposed that, for example, a solution in which CNTs are dispersed may be prepared, this solution may be applied onto a substrate or the like so as to cause a plurality of CNTs to assemble in a film shape to form a carbon nanotube film (hereinafter, also referred to as a "CNT film"), which is sometimes also referred to as "buckypaper", and then this CNT film may be used as a conductive film or the like. In one known example of an applicator liquid in which CNTs are dispersed, the applicator liquid contains high-purity CNTs that are dispersed in a solvent (refer to Patent Literature (PTL) 1).

CITATION LIST

Patent Literature

PTL 1: U.S. Pat. No. 7,556,746 B2

SUMMARY

Technical Problem

However, dispersibility of CNTs in the applicator liquid described in PTL 1 is inadequate. Since a CNT film formed using an applicator liquid with inadequate dispersibility has poor electrical conductivity and strength, there is currently demand for fibrous carbon nanostructure-containing dispersion liquids having excellent dispersibility.

Accordingly, an objective of the present disclosure is to provide a fibrous carbon nanostructure dispersion liquid having excellent fibrous carbon nanostructure dispersibility and a method of producing this fibrous carbon nanostructure dispersion liquid.

Another objective of the present disclosure is to provide a fibrous carbon nanostructure that when used in preparation of a dispersion liquid, can improve dispersibility of the obtained dispersion liquid.

Solution to Problem

The inventor conducted diligent investigation to achieve the objectives set forth above. The inventor discovered that when fibrous carbon nanostructures contained in a dispersion liquid have a property satisfying a specific condition, a dispersion liquid having excellent dispersibility in which the fibrous carbon nanostructures tend not to aggregate is obtained. In this manner, the inventor completed the present disclosure.

Specifically, the present disclosure aims to advantageously solve the problems set forth above by disclosing a fibrous carbon nanostructure dispersion liquid comprising: fibrous carbon nanostructures having at least one absorption peak in a wavenumber region of 500 $cm^{-1}$ to 600 $cm^{-1}$ in a light absorption spectrum; and a solvent. Fibrous carbon nanostructures having specific absorption characteristics such as set forth above tend not to aggregate in a dispersion liquid and thus a dispersion liquid containing these fibrous carbon nanostructures has high dispersibility.

Note that an "absorption peak" referred to in the present specification can be detected by fitting of a light absorption spectrum with a quadratic polynomial.

In the presently disclosed fibrous carbon nanostructure dispersion liquid, a ratio of oxygen atoms in the fibrous carbon nanostructures is preferably 11 at % or more. A dispersion liquid such as set forth above has even better fibrous carbon nanostructure dispersibility.

The "ratio of oxygen atoms" referred to in the present specification is a value expressed by a ratio of the amount of all atoms and the amount of oxygen (O) atoms present at the surface of fibrous carbon nanostructures as determined by X-ray photoelectron spectroscopy. More specifically, the "ratio of oxygen atoms" is a value that is determined by calculating the proportion constituted by the amount of oxygen (O) atoms when the amount of all atoms included at the fibrous carbon nanostructure surface is taken to be 100 at %. The "ratio of oxygen atoms" can be calculated based on X-ray photoelectron spectroscopy.

In the presently disclosed fibrous carbon nanostructure dispersion liquid, it is preferable that the fibrous carbon nanostructures include carbon nanotubes, and the fibrous carbon nanostructures including the carbon nanotubes have a G/D ratio of less than 2.0. When the fibrous carbon nanostructures contained in the dispersion liquid include carbon nanotubes and when these fibrous carbon nanostructures have a G/D ratio of less than 2.0, the dispersion liquid has even better dispersibility.

The "G/D ratio" is the ratio of G-band peak intensity relative to D-band peak intensity in a Raman spectrum.

In the presently disclosed fibrous carbon nanostructure dispersion liquid, it is preferable that the fibrous carbon nanostructures include carbon nanotubes, and the fibrous carbon nanostructures including the carbon nanotubes have a specific surface area of 400 $m^2/g$ or less. When the fibrous carbon nanostructures contained in the dispersion liquid include carbon nanotubes and when these fibrous carbon nanostructures have a specific surface area of 400 $m^2/g$ or less, the dispersion liquid has even better dispersibility.

The "specific surface area of fibrous carbon nanostructures" is the nitrogen adsorption specific surface area measured by the BET method.

Moreover, the present disclosure aims to advantageously solve the problems set forth above by disclosing a method of producing a fibrous carbon nanostructure dispersion liquid comprising: a step (A) of performing oxidation treatment of fibrous carbon nanostructures having at least one absorption peak in a wavenumber region of 200 $cm^{-1}$ to 300 $cm^{-1}$ in a light absorption spectrum; and a step (B) of performing dispersing treatment of a mixed liquid containing acid-treated fibrous carbon nanostructures obtained through the step (A) to obtain a dispersion liquid in which fibrous carbon nanostructures having at least one absorption peak in a wavenumber region of 500 $cm^{-1}$ to 600 $cm^{-1}$ in a light absorption spectrum are dispersed. A fibrous carbon nanostructure dispersion liquid having high dispersibility can be efficiently obtained through this production method including the steps (A) and (B).

In the presently disclosed method of producing a fibrous carbon nanostructure dispersion liquid, a ratio of oxygen atoms in the acid-treated fibrous carbon nanostructures obtained through the step (A) is preferably 11 at % or more. A fibrous carbon nanostructure dispersion liquid having even higher dispersibility can be obtained through this production method.

Furthermore, the present disclosure aims to advantageously solve the problems set forth above by disclosing a fibrous carbon nanostructure having at least one absorption peak in a wavenumber region of 500 $cm^{-1}$ to 600 $cm^{-1}$ in a light absorption spectrum and having a ratio of oxygen atoms of 11 at % or more. When a fibrous carbon nanostructure such as set forth above is used in preparation of a dispersion liquid, the obtained dispersion liquid can be provided with excellent dispersibility.

Moreover, it is preferable that the presently disclosed fibrous carbon nanostructure comprises a carbon nanotube and has a G/D ratio of less than 2.0. When a fibrous carbon nanostructure such as set forth above is used in preparation of a dispersion liquid, the obtained dispersion liquid can be provided with even better dispersibility.

Furthermore, it is preferable that the presently disclosed fibrous carbon nanostructure comprises a carbon nanotube and has a specific surface area of 400 $m^2/g$ or less. When a fibrous carbon nanostructure such as set forth above is used in preparation of a dispersion liquid, the obtained dispersion liquid can be provided with even better dispersibility.

Advantageous Effect

According to the present disclosure, it is possible to provide a fibrous carbon nanostructure dispersion liquid having excellent fibrous carbon nanostructure dispersibility and a method of producing this fibrous carbon nanostructure dispersion liquid.

Moreover, according to the present disclosure, it is possible to provide a fibrous carbon nanostructure that when used in preparation of a dispersion liquid, can improve dispersibility of the obtained dispersion liquid.

BRIEF DESCRIPTION OF THE DRAWING

In the accompanying drawing,
FIG. 1 is a graph illustrating an example of a t-plot for a sample having pores at the surface.

DETAILED DESCRIPTION

The following provides a detailed description of embodiments of the present disclosure.
(Fibrous Carbon Nanostructure Dispersion Liquid)

The presently disclosed fibrous carbon nanostructure dispersion liquid contains a solvent and fibrous carbon nanostructures having at least one absorption peak in a wavenumber region of 500 $cm^{-1}$ to 600 $cm^{-1}$ in a light absorption spectrum. The presently disclosed dispersion liquid has excellent dispersibility as a result of containing the fibrous carbon nanostructures having at least one absorption peak in a wavenumber region of 500 $cm^{-1}$ to 600 $cm^{-1}$ in a light absorption spectrum. Although it is not clear why this results in excellent dispersibility, the reason is presumed to be as follows.

The inventor focused on an idea that the wavenumber region in which an absorption peak is detected in a light absorption spectrum may reflect the length of a fibrous carbon nanostructure and also the distance between defects formed in the fibrous carbon nanostructure. The inventor made a new finding that when a dispersion liquid contains fibrous carbon nanostructures that can exhibit an absorption peak in a specific wavenumber region (i.e., that have a specific length and/or a specific defect frequency), dispersibility of the fibrous carbon nanostructures in the dispersion liquid can be remarkably improved, and in this manner completed the present disclosure.

<Fibrous Carbon Nanostructures Contained in Dispersion Liquid>

The fibrous carbon nanostructures contained in the presently disclosed fibrous carbon nanostructure dispersion liquid may be any fibrous carbon nanostructures such as carbon nanotubes or vapor-grown carbon fibers without any specific limitations other than having at least one absorption peak in a wavenumber region of 500 $cm^{-1}$ to 600 $cm^{-1}$. One type of fibrous carbon nanostructure may be contained in the dispersion liquid, or two or more types of fibrous carbon nanostructures may be contained in the dispersion liquid in a mixed state.

In particular, it is preferable that the fibrous carbon nanostructures contained in the presently disclosed fibrous carbon nanostructure dispersion liquid are fibrous carbon nanostructures that include carbon nanotubes. When fibrous carbon nanostructures that include carbon nanotubes are contained in the dispersion liquid, the dispersion liquid can be used to form a carbon film having even better electrical conductivity and strength. The term "carbon film" as used in the present specification refers to a film composed by an assembly of fibrous carbon nanostructures such as carbon nanotubes.

The fibrous carbon nanostructures including carbon nanotubes are not specifically limited and may be fibrous carbon nanostructures that include only carbon nanotubes (CNTs) or may be a mixture of CNTs and fibrous carbon nanostructures other than CNTs.

The fibrous carbon nanostructures contained in the presently disclosed fibrous carbon nanostructure dispersion liquid preferably have one absorption peak. In a case in which the fibrous carbon nanostructures contained in the dispersion liquid have more than one absorption peak, it is preferable that at least the most intense absorption peak is within the wavenumber region of 500 $cm^{-1}$ to 600 $cm^{-1}$. It is also preferable that the fibrous carbon nanostructures contained in the dispersion liquid do not have an absorption peak in a wavenumber region of less than 500 $cm^{-1}$ or a wavenumber region of more than 600 $cm^{-1}$. Moreover, the fibrous carbon nanostructures contained in the dispersion liquid preferably have at least one absorption peak in a region of 510 $cm^{-1}$ to 560 $cm^{-1}$.

The ratio of oxygen atoms in the fibrous carbon nanostructures contained in the presently disclosed fibrous carbon nanostructure dispersion liquid is preferably 11 at % or more. The dispersion liquid has even better fibrous carbon nanostructure dispersibility when the ratio of oxygen atoms in the contained fibrous carbon nanostructures is 11 at % or more. The ratio of oxygen atoms in the fibrous carbon nanostructures is more preferably 13 at % or more and is more preferably 16 at % or less. When the ratio of oxygen atoms in the fibrous carbon nanostructures is 16 at % or less, dispersibility in the dispersion liquid can be further improved while also inhibiting loss of electrical conductivity, thermal conductivity, and strength of the fibrous carbon nanostructure.

The G/D ratio of the fibrous carbon nanostructures contained in the presently disclosed fibrous carbon nanostructure dispersion liquid is preferably less than 2.0, more preferably 1.5 or less, even more preferably 1.0 or less, and particularly preferably 0.8 or less. Fibrous carbon nanostructures with a G/D ratio of less than 2.0 have excellent dispersibility and can further improve dispersibility in the dispersion liquid. Note that in a situation in which the fibrous carbon nanostructures are fibrous carbon nanostructures obtained through a step (A) of the presently disclosed production method, which is described further below, this may mean that severing and oxidation of the fibrous carbon nanostructures have occurred in the step (A) to an extent that can sufficiently increase dispersibility of the fibrous carbon nanostructures.

The BET specific surface area of the fibrous carbon nanostructures contained in the presently disclosed fibrous carbon nanostructure dispersion liquid is preferably 400 $m^2/g$ or less, more preferably 300 $m^2/g$ or less, and even more preferably 250 $m^2/g$ or less, and is normally 10 $m^2/g$ or more. Fibrous carbon nanostructures with a BET specific surface area of 400 $m^2/g$ or less have excellent dispersibility and can further improve dispersibility in the dispersion liquid. Note that in a situation in which the fibrous carbon nanostructures having a BET specific surface area that is not more than any of the upper limits set forth above are fibrous carbon nanostructures obtained through a step (A) of the presently disclosed production method, which is described further below, this BET specific surface area value may indicate that oxidation of the fibrous carbon nanostructures has occurred in the step (A) to an extent that can sufficiently increase dispersibility of the fibrous carbon nanostructures. More specifically, performing acid treatment to obtain a BET specific surface area that is not more than any of the upper limits set forth above is presumed to enable improvement of dispersibility in the dispersion liquid for the following reason, particularly in the case of fibrous carbon nanostructures including CNTs.

Firstly, measurement of BET specific surface area is normally carried out after a sample has been dried. Therefore, in a case in which the fibrous carbon nanostructures are CNTs, solvent present between graphene sheet walls forming the CNTs has been removed. During the above, CNTs for which acid treatment has progressed further form denser bundles, resulting in a lower specific surface area. On the other hand, in a situation in which CNTs are actually dispersed in a dispersion liquid, solvent is present between walls of the CNTs, and dispersion is thought to be stabilized by formation of an electric double layer by acid-treated CNTs and solvent molecules of the dispersion liquid. For this reason, dispersion stability is presumed to increase with increasing progression of acid treatment.

<Solvent>

The solvent contained in the presently disclosed fibrous carbon nanostructure dispersion liquid may be a non-halogenated solvent or a non-aqueous solvent, for example. Specific examples of the solvent include water; alcohols such as methanol, ethanol, n-propanol, isopropanol, n-butanol, isobutanol, t-butanol, pentanol, hexanol, heptanol, octanol, nonanol, decanol, amyl alcohol, methoxypropanol, propylene glycol, and ethylene glycol; ketones such as acetone, methyl ethyl ketone, and cyclohexanone; esters such as ethyl acetate, butyl acetate, ethyl lactate, esters of α-hydroxycarboxylic acids, and benzyl benzoate; ethers such as diethyl ether, dioxane, tetrahydrofuran, and monomethyl ether; amide-based polar organic solvents such as N,N-dimethylformamide and N-methylpyrrolidone; aromatic hydrocarbons such as toluene, xylene, chlorobenzene, orthodichlorobenzene, and paradichlorobenzene; and salicylaldehyde, dimethyl sulfoxide, 4-methyl-2-pentanone, N-methylpyrrolidone, γ-butyrolactone, and tetramethylammonium hydroxide. Of these solvents, water, ethyl lactate, isopropanol, and methyl ethyl ketone are preferable from a viewpoint of having particularly good dispersibility. One of these solvents may be used individually, or two or more of these solvents may be used as a mixture.

In terms of the concentration of the fibrous carbon nanostructures in the presently disclosed fibrous carbon nanostructure dispersion liquid, it is preferable that 1 mg or more of the fibrous carbon nanostructures are contained per 1 L of the solvent, and more preferable that 100 mg or more of the fibrous carbon nanostructures are contained per 1 L of the solvent. Moreover, it is preferable that 10,000 mg or less of the fibrous carbon nanostructures are contained per 1 L of the solvent. The inclusion of 1 mg or more of the fibrous carbon nanostructures relative to the solvent enables formation of a carbon film having excellent electrical conductivity and strength. Moreover, the inclusion of 10,000 mg or less of the fibrous carbon nanostructures inhibits aggregation of the fibrous carbon nanostructures and enables a dispersion liquid having even better fibrous carbon nanostructure dispersibility to be obtained.

The concentration of the fibrous carbon nanostructures in the presently disclosed fibrous carbon nanostructure dispersion liquid is preferably 0.005 mass % or more, and more preferably 0.01 mass % or more, and is preferably 5 mass % or less, and more preferably 0.5 mass % or less. A fibrous carbon nanostructure concentration of 0.005 mass % or more enables formation of a carbon film having excellent electrical conductivity and strength. Moreover, a fibrous carbon nanostructure concentration of 5 mass % or less inhibits aggregation of the fibrous carbon nanostructures and enables a dispersion liquid having even better fibrous carbon nanostructure dispersibility to be obtained.

It is preferable that the presently disclosed fibrous carbon nanostructure dispersion liquid does not substantially contain a dispersant from a viewpoint that a carbon film having even better electrical conductivity and strength can be formed and a dispersion liquid having even better fibrous carbon nanostructure dispersibility is obtained. The phrase "does not substantially contain" as used in the present specification means not intentionally containing, other than by unavoidable inclusion. More specifically, this means that the content in the fibrous carbon nanostructure dispersion liquid is preferably less than 0.05 mass %, more preferably less than 0.01 mass %, and even more preferably less than 0.001 mass %.

Examples of dispersants include surfactants, synthetic polymers, and natural polymers.

The concentration of metal impurities in the presently disclosed fibrous carbon nanostructure dispersion liquid is preferably less than $1 \times 10^{18}$ atoms/$cm^3$, and more preferably less than $15 \times 10^{16}$ atoms/$cm^3$ from a viewpoint that impurities in the fibrous carbon nanostructure dispersion liquid can be reduced and an electronic component having a long service life and stable characteristics can be produced.

It is preferable that the presently disclosed fibrous carbon nanostructure dispersion liquid does not substantially contain sediments and aggregates of the fibrous carbon nanostructures from a viewpoint that fibrous carbon nanostructure dispersibility is further improved and a uniform carbon film can be formed.

In the present specification, the terms "sediments" and "aggregates" refer to fibrous nanostructures that sediment upon 20 minutes of centrifugation at 10,000 G.

<Physical Properties>

The viscosity of the presently disclosed fibrous carbon nanostructure dispersion liquid is preferably 0.5 mPa·s or more, and more preferably 1 mPa·s or more, and is preferably 1,000 mPa·s or less, and more preferably 100 mPa·s or less. The fibrous carbon nanostructure dispersion liquid has excellent fibrous carbon nanostructure dispersibility when the viscosity thereof is not less than 0.5 mPa·s and not more than 1,000 mPa·s.

The "viscosity of a fibrous carbon nanostructure dispersion liquid" referred to in the present disclosure can be measured in accordance with JIS Z8803 at a temperature of 25° C. and with at least one shear rate within a range of 10 $s^{-1}$ to 1,000 $s^{-1}$ (for example, 152 $s^{-1}$).

From a viewpoint of dispersibility, the light absorbance of the presently disclosed fibrous carbon nanostructure dispersion liquid measured at a wavelength of 550 nm and with an optical path length of 1 mm using a spectrophotometer is preferably 0.1 or more, and more preferably 0.2 or more, and is preferably 10 or less, and more preferably 5 or less. It is possible to ensure that a sufficient amount of fibrous carbon nanostructures is contained in the fibrous carbon nanostructure dispersion liquid when the light absorbance of the fibrous carbon nanostructure dispersion liquid is 0.1 or more. Moreover, the proportion of fibrous carbon nanostructures having high dispersibility in the fibrous carbon nanostructure dispersion liquid can be increased and a carbon film having excellent electrical conductivity and strength can be formed when the light absorbance of the fibrous carbon nanostructure dispersion liquid is 10 or less.

A light absorbance ratio of the presently disclosed fibrous carbon nanostructure dispersion liquid is preferably 0.5 or more, and more preferably not less than 0.7 and not more than 1.0 from a viewpoint that the amount of aggregates is small, purity is high, and fibrous carbon nanostructure dispersibility is excellent.

The "light absorbance ratio" referred to in the present disclosure can be calculated by measuring light absorbance at a wavelength of 550 nm and with an optical path length of 1 mm using a spectrophotometer for both a fibrous carbon nanostructure dispersion liquid and a purified dispersion liquid obtained through filtration purification of the fibrous carbon nanostructure dispersion liquid, and then dividing the value of light absorbance for the purified dispersion liquid by the value of light absorbance for the fibrous carbon nanostructure dispersion liquid that has not been subjected to filtration purification.

A high light absorbance ratio, and thus a small change in light absorbance of the fibrous carbon nanostructure dispersion liquid between before and after filtration purification, means that the fibrous carbon nanostructures contained in the dispersion liquid have low aggregability and the fibrous carbon nanostructure dispersion liquid has excellent dispersibility.

<Use>

The presently disclosed fibrous carbon nanostructure dispersion liquid can be used in production of electronic products, examples of which include electronic components such as electronic circuits (for example, logic circuits), memory (for example, DRAM, SRAM, and NRAM), semiconductor devices, interconnects, complementary MOS, and bipolar transistors; chemical sensors such as detectors for trace gases and the like; biosensors such as measuring instruments for DNA, proteins, and the like; and conductive films for solar cells, touch panels, and the like. For example, the presently disclosed fibrous carbon nanostructure dispersion liquid may be used as an applicator liquid or a constituent material in production of an electronic product. Of such applications, use as a constituent material of a semiconductor device is suitable from a viewpoint that a product having excellent electrical conductivity and strength is obtained.

(Method of Producing Fibrous Carbon Nanostructure Dispersion Liquid)

The presently disclosed method of producing a fibrous carbon nanostructure dispersion liquid includes: a step (A) of performing oxidation treatment of fibrous carbon nanostructures having at least one absorption peak in a wavenumber region of 200 $cm^{-1}$ to 300 $cm^{-1}$ in a light absorption spectrum; and a step (B) of performing dispersing treatment of a mixed liquid containing acid-treated fibrous carbon nanostructures obtained through the step (A) to obtain a dispersion liquid in which fibrous carbon nanostructures having at least one absorption peak in a wavenumber region of 500 $cm^{-1}$ to 600 $cm^{-1}$ in a light absorption spectrum are dispersed. The step (B) may optionally include an operation of performing centrifugal separation of a dispersed mixture containing a plurality of fibrous carbon nanostructures and a solvent to cause sedimentation of a portion of the plurality of fibrous carbon nanostructures (centrifugal separation) and an operation of fractionating a supernatant obtained through the centrifugal separation (fractionation). Moreover, an impurity separation step may optionally be implemented between the step (A) and the step (B).

Through the presently disclosed method of producing a fibrous carbon nanostructure dispersion liquid that includes at least the steps (A) and (B), a dispersion liquid having excellent fibrous carbon nanostructure dispersibility can be efficiently obtained.

<Step (A)>

In the step (A), fibrous carbon nanostructures having at least one absorption peak in a wavenumber region of 200 $cm^{-1}$ to 300 $cm^{-1}$ in a light absorption spectrum are oxidation treated. The following provides a detailed description of suitable attributes of the fibrous carbon nanostructures used as a material in the presently disclosed production method, which have at least one absorption peak in the wavenumber region of 200 $cm^{-1}$ to 300 $cm^{-1}$ (hereinafter, also referred to simply as a "specific first optical property"). The fibrous carbon nanostructures used as a material having the specific first optical property preferably have one absorption peak in the wavenumber region of 200 $cm^{-1}$ to 300 $cm^{-1}$ from a viewpoint of improving dispersibility of the obtained dispersion liquid.

Moreover, the fibrous carbon nanostructures used as a material preferably have one peak. In a case in which the fibrous carbon nanostructures used as a material have more than one absorption peak, it is preferable that at least the most intense absorption peak is within the wavenumber region of 200 $cm^{-1}$ to 300 $cm^{-1}$. It is also preferable that the fibrous carbon nanostructures used as a material do not have an absorption peak in a wavenumber region of less than 200 $cm^{-1}$ or a wavenumber region of more than 300 $cm^{-1}$. Moreover, the fibrous carbon nanostructures used as a material preferably have at 1 east one absorption peak in a region of 210 $cm^{-1}$ to 270 $cm^{-1}$. This is because dispersibility of the fibrous carbon nanostructures in a dispersion liquid can be further improved.

[Fibrous Carbon Nanostructures Used as Material]

The fibrous carbon nanostructures used as a material in the presently disclosed production method may, for example, be carbon nanotubes, vapor-grown carbon fibers, or the like as previously described in relation to fibrous carbon nanostructures that can be contained in the previously described dispersion liquid. Note that the fibrous carbon nanostructures used as a material may include only CNTs or may be a mixture of CNTs and fibrous carbon nanostructures other than CNTs. It is more preferable that fibrous carbon nanostructures including CNTs have not undergone CNT opening treatment and exhibit a convex upward shape in a t-plot obtained from an adsorption isotherm.

Typically, adsorption is a phenomenon in which gas molecules are taken onto a solid surface from the gas phase and is categorized as physical adsorption or chemical adsorption depending on the main cause of adsorption. The nitrogen gas adsorption method used for obtaining the t-plot utilizes physical adsorption. In general, when the adsorption temperature is kept constant, the number of nitrogen gas molecules that are adsorbed by a fibrous carbon nanostructure increases with increasing pressure. A plot of the relative pressure (ratio of pressure at adsorption equilibrium P and saturated vapor pressure P0) on a horizontal axis and the amount of adsorbed nitrogen gas on a vertical axis is referred to as an "isotherm". The isotherm is referred to as an "adsorption isotherm" in a situation in which the amount of adsorbed nitrogen gas is measured while increasing the pressure and is referred to as a "desorption isotherm" in a situation in which the amount of adsorbed nitrogen gas is measured while decreasing the pressure.

The t-plot is obtained from the adsorption isotherm measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

FIG. 1 illustrates a typical t-plot for a sample having pores at the surface. In a sample having pores at its surface, the growth of the adsorbed layer of nitrogen gas is categorized into the following processes (1) to (3). The gradient of the t-plot changes in accordance with processes (1) to (3) as illustrated in FIG. 1.

(1) A process in which a single molecule adsorption layer of nitrogen molecules is formed over the entire surface (2) A process in which a multi-molecule adsorption layer is formed and is accompanied by capillary condensation filling of pores (3) A process in which a multi-molecule adsorption layer is formed at a surface that appears to be non-porous due to the pores being filled by nitrogen The t-plot for the fibrous carbon nanostructures used as a material in the presently disclosed production method is on a straight line passing through the origin in a region in which the average adsorbed nitrogen gas layer thickness t is small and deviates downward from the straight line as t increases to have a convex upward shape as illustrated in FIG. 1. The shape of the t-plot described above indicates that the fibrous carbon nanostructures have a large ratio of internal specific surface area relative to total specific surface area and that there is a large number of openings in carbon nanostructures constituting the fibrous carbon nanostructures. As a result, the fibrous carbon nanostructures have a lower tendency to aggregate.

A bending point of the t-plot for the fibrous carbon nanostructures used as a material is preferably within a range of 0.2 t (nm) 1.5, more preferably within a range of 0.45 t (nm) 1.5, and even more preferably within a range of 0.55≤t (nm)≤1.0. When the position of the bending point of the t-plot is within any of the ranges set forth above, the fibrous carbon nanostructures have an even lower tendency to aggregate, and a dispersion liquid having even better fibrous carbon nanostructure dispersibility is obtained.

The "position of the bending point" is defined as an intersection point of a linear approximation A for the above-described process (1) and a linear approximation B for the above-described process (3).

A ratio (S2/S1) of internal specific surface area S2 relative to total specific surface area S1 obtained from the t-plot for the fibrous carbon nanostructures used as a material is preferably not less than 0.05 and not more than 0.30. When S2/S1 is not less than 0.05 and not more than 0.30, the fibrous carbon nanostructures have an even lower tendency to aggregate, and a dispersion liquid having even better fibrous carbon nanostructure dispersibility can be obtained.

Although no specific limitations are placed on the total specific surface area S1 and the internal specific surface area S2 of the fibrous carbon nanostructures used as a material, individually, S1 is preferably not less than 400 $m^2/g$ and not more than 2,500 $m^2/g$, and more preferably not less than 800 $m^2/g$ and not more than 1,200 $m^2/g$, whereas S2 is preferably not less than 30 $m^2/g$ and not more than 540 $m^2/g$.

The total specific surface area S1 and the internal specific surface area S2 of the fibrous carbon nanostructures can be determined from the t-plot for the fibrous carbon nanostructures. Specifically, referring to the t-plot illustrated in FIG. 1 for the purpose of explanation, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm for fibrous carbon nanostructures, preparation of a t-plot, and calculation of total specific surface area S1 and internal specific surface area S2 based on t-plot analysis can be made using a BELSORP®-mini (BELSORP is a registered trademark in Japan, other countries, or both), for example, which is a commercially available measurement instrument produced by Bel Japan Inc.

In a situation in which fibrous carbon nanostructures including CNTs are used as a material, although no specific limitations are placed on the CNTs included among the fibrous carbon nanostructures and single-walled carbon nanotubes and/or multi-walled carbon nanotubes may be used, the CNTs are preferably carbon nanotubes having one to five walls, and are more preferably single-walled carbon nanotubes. By using single-walled carbon nanotubes, it is possible to obtain a dispersion liquid having excellent fibrous carbon nanostructure dispersibility compared to a situation in which multi-walled carbon nanotubes are used.

The fibrous carbon nanostructures used as a material are preferably fibrous carbon nanostructures for which a ratio 3σ/Av of a value 3σ obtained by multiplying the diameter standard deviation (σ) by 3 relative to the average diameter (Av) is more than 0.20 and less than 0.60, more preferably fibrous carbon nanostructures for which $3\sigma/Av$ is more than 0.25, and even more preferably fibrous carbon nanostructures for which $3\sigma/Av$ is more than 0.40. When fibrous carbon nanostructures for which $3\sigma/Av$ is more than 0.20 and less than 0.60 are used, a dispersion liquid having even better fibrous carbon nanostructure dispersibility can be obtained.

Herein, the "average diameter (Av) of the fibrous carbon nanostructures" and the "diameter standard deviation ($\sigma$: sample standard deviation) of the fibrous carbon nanostructures" can each be obtained by measuring the diameters (external diameters) of 100 randomly selected fibrous carbon nanostructures using a transmission electron microscope. The average diameter (Av) and the standard deviation ($\sigma$) of the fibrous carbon nanostructures may be adjusted by altering the production method or production conditions of the fibrous carbon nanostructures, or may be adjusted by combining a plurality of types of fibrous carbon nanostructures obtained by different production methods.

The fibrous carbon nanostructures used as a material are typically fibrous carbon nanostructures that take a normal distribution when a plot is made of diameter measured as described above on a horizontal axis and probability density thereof on a vertical axis, and a Gaussian approximation is made.

Moreover, the fibrous carbon nanostructures used as a material preferably have a radial breathing mode (RBM) peak when evaluated by Raman spectroscopy. Note that an RBM is not present in the Raman spectrum of fibrous carbon nanostructures composed only of multi-walled carbon nanotubes having three or more walls.

The fibrous carbon nanostructures used as a material preferably have a G/D ratio of not less than 2.0 and not more than 10.0. When the G/D ratio is not less than 2.0 and not more than 10.0, acid treatment can be efficiently carried out in the step (A), and a dispersion liquid having even better fibrous carbon nanostructure dispersibility can be obtained.

The average diameter (Av) of the fibrous carbon nanostructures used as a material is preferably 0.5 nm or more, and more preferably 1 nm or more, and is preferably 15 nm or less, and more preferably 10 nm or less. When the average diameter (Av) of the fibrous carbon nanostructures is not less 0.5 nm and not more than 15 nm, a dispersion liquid having even better fibrous carbon nanostructure dispersibility can be obtained.

The fibrous carbon nanostructures used as a material preferably have an average structure length at the time of synthesis of 100 µm or more. Fibrous carbon nanostructures that have a longer structure length at the time of synthesis tend to be more easily damaged by breaking, severing, or the like during dispersion. Therefore, it is preferable that the average structure length at the time of synthesis is 5,000 µm or less. The average length at the time of synthesis of the fibrous carbon nanostructures used as a material is more preferably 1,000 µm or less from a viewpoint of improving dispersibility of the obtained dispersion liquid.

The aspect ratio (length/diameter) of the fibrous carbon nanostructures used as a material is preferably more than 10. The aspect ratio of the fibrous carbon nanostructures can be determined by measuring the diameters and lengths of 100 randomly selected fibrous carbon nanostructures using a transmission electron microscope, and then calculating an average value of the ratio of diameter and length (length/diameter).

The BET specific surface area of the fibrous carbon nanostructures used as a material is preferably 800 $m^2$/g or more, and more preferably 1,000 $m^2$/g or more, and is preferably 2,500 $m^2$/g or less, and more preferably 1,500 $m^2$/g or less. When the BET specific surface area of the fibrous carbon nanostructures is 800 $m^2$/g or more, the contact area with acid in the step (A) can be increased, and a dispersion liquid having even better fibrous carbon nanostructure dispersibility can be obtained. Moreover, when the BET specific surface area of the fibrous carbon nanostructures is 2,500 $m^2$/g or less, loss of characteristics of the fibrous carbon nanostructures such as electrical conductivity, thermal conductivity, and strength can be inhibited.

In the subsequently described super growth method, the fibrous carbon nanostructures used as a material are obtained on a substrate having a catalyst layer for carbon nanotube growth at the surface and are obtained in the form of an assembly aligned roughly perpendicularly to the substrate (aligned assembly). The mass density of the fibrous carbon nanostructures in the form of such an assembly is preferably not less than 0.002 $g/cm^3$ and not more than 0.2 $g/cm^3$. The fibrous carbon nanostructures can be homogeneously dispersed in the fibrous carbon nanostructure dispersion liquid when the mass density is 0.2 $g/cm^3$ or less because binding between the fibrous carbon nanostructures in the liquid is weak. A mass density of 0.002 $g/cm^3$ or more improves the unity of the fibrous carbon nanostructures, thus preventing the fibrous carbon nanostructures from becoming unbound and making the fibrous carbon nanostructures easier to handle.

The fibrous carbon nanostructures used as a material preferably include micropores. In particular, the fibrous carbon nanostructures preferably include micropores having a pore diameter of smaller than 2 nm, and the amount of these micropores in terms of micropore volume determined by the following method is preferably 0.40 mL/g or more, more preferably 0.43 mL/g or more, and even more preferably 0.45 mL/g or more, and normally has an upper limit of approximately 0.65 mL/g. When the fibrous carbon nanostructures include micropores such as described above, the fibrous carbon nanostructures have an even lower tendency to aggregate. The micropore volume can be adjusted, for example, through appropriate alteration of the production method and production conditions of the fibrous carbon nano structures.

The "micropore volume (Vp)" can be calculated from equation (I): $Vp=(V/22,414)\times(M/\rho)$ by measuring a nitrogen adsorption/desorption isotherm of the fibrous carbon nanostructures at liquid nitrogen temperature (77 K) and taking the amount of adsorbed nitrogen at a relative pressure of P/P0=0.19 to be V. It should be noted that P is measured pressure at adsorption equilibrium, P0 is saturated vapor pressure of liquid nitrogen at time of measurement, and, in equation (I), M is a molecular weight of 28.010 of the adsorbate (nitrogen), and $\rho$ is a density of 0.808 $g/cm^3$ of the adsorbate (nitrogen) at 77 K. The micropore volume can be measured using a BELSORP®-mini (produced by Bel Japan Inc.), for example.

The fibrous carbon nanostructures used as a material can be efficiently produced by, for example, in a method in which during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve catalytic activity of the catalyst layer (super growth method; refer to WO 2006/011655 A1), forming the catalyst layer on the substrate surface by a wet process. Hereinafter, carbon nanotubes that are obtained by the super growth method are also referred to as "SGCNTs".

The concentration of metal impurities contained in the fibrous carbon nanostructures used as a material is preferably less than 5,000 ppm, and more preferably less than 1,000 ppm from a viewpoint that this reduces impurities in the fibrous carbon nanostructure dispersion liquid and enables production of an electronic component having a long service life and stable characteristics.

The concentration of metal impurities referred to in the present specification can be measured, for example, by a transmission electron microscope (TEM), a scanning electron microscope (SEM), energy dispersive X-ray analysis (EDAX), a vapor phase decomposition device and ICP mass spectrometry (VPD, ICP/MS), or the like.

The metal impurities may be metal catalyst used in production of the fibrous carbon nanostructures or the like, and examples thereof include metal elements such as alkali metals, alkaline earth metals, various metal elements belonging to groups 3 to 13 and the lanthanides, Si, Sb, As, Pb, Sn, and Bi, and metal compounds containing these metal elements. More specific examples include metal elements such as Al, Sb, As, Ba, Be, Bi, B, Cd, Ca, Cr, Co, Cu, Ga, Ge, Fe, Pb, Li, Mg, Mn, Mo, Ni, K, Na, Sr, Sn, Ti, W, V, Zn, and Zr, and metal compounds containing these metal elements.

From a viewpoint of further improving dispersibility of the fibrous carbon nanostructure dispersion liquid and forming a uniform carbon film to produce an electronic component having stable characteristics, the fibrous carbon nanostructures used as a material preferably do not substantially include particulate impurities having a particle diameter of more than 500 nm, more preferably do not substantially include particulate impurities having a particle diameter of more than 300 nm, even more preferably do not substantially include particulate impurities having a particle diameter of more than 100 nm, and particularly preferably do not substantially include particulate impurities having a particle diameter of more than 45 nm.

The concentration of particulate impurities referred to in the present specification can be measured by applying the fibrous carbon nanostructure dispersion liquid onto a substrate and measuring the surface thereof using a Surfscan (product name) produced by KLA-Tencor Corporation or the like.

Of these various attributes of the fibrous carbon nanostructures used as a material, the average diameter preferably satisfies the same numerical range as set forth above even when the fibrous carbon nanostructures are in a state contained in a dispersion liquid.

[Oxidation Treatment]

The oxidation treatment may involve, for example, adding the fibrous carbon nanostructures into an acidic solution having a pH of 2 or lower, obtaining a mixed liquid, and performing oxidation treatment of the fibrous carbon nanostructures. More specifically, it is preferable that fibrous carbon nanostructures in the mixed liquid are oxidation treated in the oxidation treatment by refluxing the mixed liquid under a specific temperature condition. The acidic solution may, for example, be nitric acid, hydrochloric acid, sulfuric acid, or the like. The method of mixing by which the mixed liquid is obtained may be any method in which a stirring operation is performed. The stirring time when obtaining the mixed liquid is preferably not less than 0.1 hours and not more than 10 hours. The temperature condition under which refluxing of the mixed liquid is performed is preferably not lower than 100° C. and not higher than 150° C., and the refluxing time is preferably not less than 3 hours and not more than 20 hours.

The solvent of the acidic solution may be any of the previously described solvents that can be contained in the presently disclosed fibrous carbon nanostructure dispersion liquid. Of these solvents, water is preferable.

<Step (B)>

In the step (B), a mixed liquid containing acid-treated fibrous carbon nanostructures obtained through the step (A) described above is subjected to dispersing treatment to obtain a dispersion liquid in which fibrous carbon nanostructures having at least one absorption peak in a wavenumber region of 500 $cm^{-1}$ to 600 $cm^{-1}$ in a light absorption spectrum (hereinafter, also referred to simply as a "specific second optical property") are dispersed. The fibrous carbon nanostructures having the specific second optical property preferably have an absorption peak in the wavenumber region of 500 $cm^{-1}$ to 600 $cm^{-1}$ from a viewpoint of improving dispersibility of the obtained dispersion liquid.

[Dispersing Treatment]

In the step (B), a mixed liquid containing acid-treated fibrous carbon nanostructures obtained through the step (A) and an optional impurity separation step, which is described further below, is subjected to dispersing treatment. This dispersing treatment may be carried out by a known dispersing treatment method used for dispersing a liquid containing fibrous carbon nanostructures, such as ultrasonic dispersing treatment, without any specific limitations.

Note that when this dispersing treatment is performed, any neutralizing agent may be added in order to adjust the mixed liquid containing acid-treated fibrous carbon nanostructures to a neutral pH (roughly pH 6 to pH 8). The neutralizing agent is not specifically limited and may, for example, be an alkaline solution of not lower than pH 9 and not higher than pH 14, and, more specifically, may be sodium hydroxide aqueous solution, ammonia aqueous solution, or the like. Moreover, when the dispersing treatment is performed, a solvent may be added to the mixed liquid containing acid-treated fibrous carbon nanostructures as necessary. The solvent added in this step may be the same solvent as used in the step (A) or a different solvent, but is preferably the same solvent.

Moreover, the dispersing treatment time is preferably not less than 1 hour and not more than 30 hours.

[Centrifugal Separation]

In the step (B), the liquid that has undergone dispersing treatment is subjected to centrifugal separation. This centrifugal separation can cause sedimentation of a portion of the plurality of fibrous carbon nanostructures contained in the liquid that has undergone dispersing treatment. Through the centrifugal separation, fibrous carbon nanostructures having high aggregability sediment and fibrous carbon nanostructures having excellent dispersibility remain in the supernatant.

The centrifugal separation of the dispersed mixture can be performed using a known centrifugal separator without any specific limitations.

In particular, the centrifugal acceleration in centrifugal separation of the dispersed mixture is preferably 2,000 G or more, and more preferably 5,000 G or more, and is preferably 20,000 G or less, and more preferably 15,000 G or less from a viewpoint of causing fibrous carbon nanostructures having excellent dispersibility to remain in the resultant supernatant to an appropriate degree and obtaining a fibrous carbon nanostructure dispersion liquid having excellent dispersibility.

Moreover, the centrifugal separation time in centrifugal separation of the dispersed mixture is preferably 20 minutes or more, and more preferably 30 minutes or more, and is preferably 120 minutes or less, and more preferably 90 minutes or less from a viewpoint of causing fibrous carbon nanostructures having excellent dispersibility to remain in the resultant supernatant to an appropriate degree and obtaining a fibrous carbon nanostructure dispersion liquid having excellent dispersibility.

[Fractionation]

After this centrifugal separation, the supernatant obtained through centrifugal separation can be fractionated. Fractionation of the supernatant can be performed, for example, by decantation, pipetting, or the like that leaves a sediment layer and collects the supernatant. Specifically, a supernatant that, for example, is present in a section from the liquid surface of the centrifugally separated dispersed mixture to ⅚ of the depth of the dispersed mixture may be collected.

The supernatant fractionated from the dispersed mixture after centrifugal separation contains fibrous carbon nanostructures that did not sediment through centrifugal separation and is a dispersion liquid in which fibrous carbon nanostructures having at least one absorption peak in a wavenumber region of 500 $cm^{-1}$ to 600 $cm^{-1}$ are dispersed.

<Impurity Separation Step>

An impurity separation step for separation of impurities may optionally be implemented between the step (A) and the step (B) described above. Specifically, the impurity separation step may include a separation operation such as high-speed centrifugation using an ultracentrifuge or the like; filter filtration by gravity filtration, cross flow filtration, vacuum filtration, or the like; selective oxidation of non-fullerene carbon material; or a combination thereof. In the case of cross flow filtration, for example, the inside of a filtration device is separated into a primary side region and a secondary side region by a filter material such as a membrane, fluid that is a target for filtration flows in at the primary side region, a portion of this fluid permeates the membrane and moves to the secondary side as a permeate, and fluid that does not permeate the membrane continues circulating in the primary side region. Accordingly, by implementing the cross flow filtration using a filter material having a pore diameter that does not allow easy permeation by the fibrous carbon nanostructures but does allow easy permeation of impurities, it is possible to cause the fibrous carbon nanostructures to remain at the primary side and impurities to move to the secondary side.

Note that in the impurity separation, any of the previously described solvents that can be contained in the presently disclosed dispersion liquid may optionally be added to the dispersion liquid containing acid-treated fibrous carbon nanostructures obtained through the step (A). The solvent added in this step may be the same solvent as used in the step (A) or a different solvent, but is preferably the same solvent.

(Fibrous Carbon Nanostructure)

The presently disclosed fibrous carbon nanostructure has at least one absorption peak in a wavenumber region of 500 $cm^{-1}$ to 600 $cm^{-1}$ in a light absorption spectrum and has a ratio of oxygen atoms of 11 at % or more. A dispersion liquid having excellent dispersibility can be obtained by using this fibrous carbon nanostructure in preparation of the dispersion liquid. The presently disclosed fibrous carbon nanostructure can be efficiently produced according to the step (A) included in the presently disclosed method of producing a fibrous carbon nanostructure dispersion liquid set forth above. In other words, the presently disclosed fibrous carbon nanostructure may be an acid-treated fibrous carbon nanostructure that is obtained through oxidation treatment of the previously described "fibrous carbon nanostructures used as a material" according to step (A). The presently disclosed fibrous carbon nanostructure preferably has various attributes such as described in "Fibrous carbon nanostructures contained in dispersion liquid" of the "Fibrous carbon nanostructure dispersion liquid" section. More specifically, the presently disclosed fibrous carbon nanostructure preferably comprises a carbon nanotube. Moreover, the presently disclosed fibrous carbon nanostructure preferably has a G/D ratio of less than 2.0. Furthermore, the presently disclosed fibrous carbon nanostructure preferably has a BET specific surface area of 400 $m^2/g$ or less.

It should be noted that the various attributes of a fibrous carbon nanostructure set forth above do not significantly change upon typical dispersing treatment such as ultrasonic dispersing treatment performed when the fibrous carbon nanostructure is used in preparation of a dispersion liquid. In other words, values measured for the various attributes of a fibrous carbon nanostructure prior to dispersing treatment are also valid for the fibrous carbon nanostructure when it is present in a dispersion liquid. The reverse of the above also applies.

EXAMPLES

The following provides a more specific description of the present disclosure based on examples. However, the present disclosure is not limited to the following examples. In the following description, "%" used in expressing quantities is by mass, unless otherwise specified.

In the examples and comparative examples, the wavenumber of an absorption peak in a light absorption spectrum (hereinafter, also referred to simply as an "absorption peak"), the G/D ratio and specific surface area of various fibrous carbon nanostructures, the ratio of oxygen atoms in acid-treated fibrous carbon nanostructures, and the light absorbance ratio of a dispersion liquid were measured or calculated as described below.

<Wavenumber of Absorption Peak>

Fibrous carbon nanostructures used as a material in each example or comparative example were added into a 1 mass % dodecylbenzenesulfonic acid solution and were subjected to ultrasonic dispersing treatment for 10 minutes using a tip type ultrasonic homogenizer (VCX 500 produced by Sonics & Materials, Inc.; power: 200 W) to prepare a dispersion liquid for absorption peak measurement. The obtained dispersion liquid for absorption peak measurement was filtered and a thin film was prepared. Note that for the fibrous carbon nanostructures contained in the dispersion liquid, the dispersion liquid was filtered and a thin film was prepared.

The thin film was set on a high-resistance silicon wafer (floating zone wafer) having an electrical resistivity of 8,000 Ω·cm or more. The following three measurement instruments were used to measure a light absorption spectrum for a region from the ultraviolet, visible, and infrared regions through to a wavenumber of 4 $cm^{-1}$.

4 $cm^{-1}$ to 70 $cm^{-1}$: THz-TDS system TR-1000 produced by Otsuka Electronics Co., Ltd.

70 $cm^{-1}$ to 8,000 $cm^{-1}$: Vertex 80v produced by Bruker Optics 25,000 $cm^{-1}$ to 5,000 $cm^{-1}$: V3100 produced by Shimadzu Corporation The obtained light absorption spectrum was fitted with a quadratic polynomial and the wavenumber of each absorption peak was determined.

<G/D Ratio>

A micro laser Raman spectrophotometer (Nicolet Almega XR produced by Thermo Fisher Scientific) was used to measure Raman spectra for fibrous carbon nanostructures used as materials in the examples and comparative examples and for acid-treated fibrous carbon nanostructures obtained in the examples and comparative examples. With respect to each of the obtained Raman spectra, the intensity of a G-band peak observed near 1590 cm$^{-1}$ and the intensity of a D-band peak observed near 1340 cm$^{-1}$ were determined, and the G/D ratio was calculated.

<Specific Surface Area>

A BET specific surface area meter (HM model-1210 produced by Mountech Co., Ltd.) was used to measure the specific surface areas of fibrous carbon nanostructures used as materials in the examples and comparative examples and acid-treated fibrous carbon nanostructures obtained in the examples and comparative examples in accordance with JIS Z8830.

<Ratio of Oxygen Atoms>

A retentate containing acid-treated fibrous carbon nanostructures obtained through a step (A) and a subsequent impurity separation step in each example or comparative example was filtered, and then the obtained filtration residue was dried and was analyzed by an X-ray photoelectron spectroscope (VG Theta Probe produced by Thermo Fisher Scientific). The area of an O1s peak and the area of all detected peaks were determined. Based on these values, a ratio (at %) of the amount of oxygen (O) atoms relative to the amount of all atoms included at the surface of the fibrous carbon nanostructures was calculated (=amount of O atoms/ amount of all atoms×100), and the calculated value was taken to be the ratio of oxygen atoms (at %).

<Light Absorbance Ratio>

A fibrous carbon nanostructure dispersion liquid prepared in each example or comparative example was purified by filtration using a 0.2 μm syringe filter (produced by Pall Corporation; product name: Acrodisc Syringe Filter) to obtain a purified dispersion liquid. A spectrophotometer (produced by JASCO Corporation; product name: V670) was then used to measure light absorbance at a wavelength of 550 nm and an optical path length of 1 mm with respect to the purified dispersion liquid and also a fibrous carbon nanostructure dispersion liquid (non-purified dispersion liquid) in the same state as produced in the corresponding example or comparative example (i.e., without being purified by filtration). A light absorbance ratio was determined by the following equation.

Light absorbance ratio=(Light absorbance of purified dispersion liquid)/(Light absorbance of non-purified dispersion liquid)

Example 1

<Preparation of Fibrous Carbon Nanostructure Dispersion Liquid>

[Step (A)]

A mixed liquid was obtained by adding 1 g of SGCNTs (ZEONANO SG101 produced by Zeon Nanotechnology Co., Ltd.; 3σ/Av: 0.58; mass density: 0.03 g/cm$^3$; micropore volume: 0.45 mL/g) as fibrous carbon nanostructures to 250 mL of 7.7 M HNO$_3$ as an acidic solution. The mixed liquid was stirred for 8 hours and was then heated to 125° C. and refluxed for 12 hours to perform oxidation treatment of the SGCNTs contained in the mixed liquid.

[Impurity Separation Step]

Next, 1,800 mL of deionized water was added to the mixed liquid obtained through the step (A) described above, ultrasonication was performed at 40 kHz for 60 minutes using an ultrasonic irradiation device (produced by Honda Electronics Co., Ltd.; product name: WTC-1200-40), and then cross flow filtration using a 0.02 μm ceramic membrane was initiated. This cross flow filtration was continued until a pH of 4.0 was reached. Liquid that had passed through the ceramic membrane was disposed of as a permeate and liquid that had not passed through the ceramic membrane was collected as a retentate. The retentate was used to measure the ratio of oxygen atoms in the acid-treated fibrous carbon nanostructures as previously described. The acid-treated fibrous carbon nanostructures in the retentate were filtered off and dried, and were then used to measure the G/D ratio and specific surface area as previously described. The results are shown in Table 1.

[Step (B)]

The retentate obtained through the impurity separation step was adjusted to a pH of 7.1 through addition of 0.1% ammonia aqueous solution as a neutralizing agent. Dispersing treatment was then performed by carrying out 2 hours of ultrasonication using an ultrasonic irradiation device. Thereafter, centrifugation was performed at 10,000 G for 20 minutes using an ultracentrifuge (produced by Hitachi Koki Co., Ltd.; product name: CP-80NX), and then the supernatant was collected. In other words, treatment for fractionating the supernatant obtained by centrifugal separation was performed. Treatment from centrifugal separation to fractionation was taken to be one cycle. Four of such cycles were performed with the supernatant fractionated in each cycle then subjected to centrifugal separation in the next cycle. The supernatant fractionated in the fourth of these cycles was taken to be a fibrous carbon nanostructure dispersion liquid. The volume of the obtained fibrous carbon nanostructure dispersion liquid was 100 mL.

Note that for the obtained fibrous carbon nanostructure dispersion liquid, the content of fibrous carbon nanostructures was 1,000 mg per 1 L of solvent, the concentration of metal impurities was less than 1.1×10$^{14}$ atoms/cm$^3$, the viscosity at a temperature of 25° C. and a shear rate of 152 s$^{-1}$ as measured in accordance with JIS Z8803 was 1.1 mPa·s, and the light absorbance at a wavelength of 550 nm with an optical path length of 1 mm was 0.7. The obtained fibrous carbon nanostructure dispersion liquid was also used to measure or calculate an absorption peak and a light absorbance ratio as previously described. The results are shown in Table 1.

Example 2

A fibrous carbon nanostructure dispersion liquid was obtained in the same way as in Example 1 with the exception that SGCNTs (ZEONANO SG101 produced by Zeon Nanotechnology Co., Ltd.) produced in a different production lot to those in Example 1 were used as fibrous carbon nanostructures. Various measurements were carried out in the same way as in Example 1. The results are shown in Table 1.

Comparative Example 1

<Synthesis of Fibrous Carbon Nanostructures>

SGCNTs were synthesized as fibrous carbon nanostructures in accordance with the super growth method described in JP 4621896 B under the following conditions. The wavenumber of an absorption peak was measured for the obtained SGCNTs as previously described. The results are shown in Table 1.

Feedstock carbon compound: Ethylene; feed rate 50 sccm
Atmosphere: Helium/hydrogen mixed gas; feed rate 1,000 sccm
Pressure: 1 atm
Water vapor additive amount: 300 ppm
Reaction temperature: 750° C.
Reaction time: 10 minutes
Metal catalyst: Iron thin film (thickness: 3 nm)
Substrate: Silicon wafer <Preparation of Fibrous Carbon Nanostructure Dispersion Liquid>

A fibrous carbon nanostructure dispersion liquid was obtained in the same way as in Example 1 with the exception that the SGCNTs synthesized as described above were used as fibrous carbon nanostructures. Various measurements were carried out in the same way as in Example 1. The results are shown in Table 1.

Comparative Example 2

A fibrous carbon nanostructure dispersion liquid was obtained in the same way as in Example 1 with the exception that CNTs (APJ produced by Meijo Nano Carbon Co., Ltd.) synthesized by the arc plasma jet method were used as fibrous carbon nanostructures. Various measurements were carried out in the same way as in Example 1. The results are shown in Table 1.

TABLE 1

|  |  | Example 1 | Example 2 | Comparative Example 1 | Comparative Example 2 |
|---|---|---|---|---|---|
| Material CNTs | Absorption peak [cm$^{-1}$] | 220 | 260 | 350 | 100 |
|  | G/D ratio [—] | 2.8 | 2.8 | 1.5 | 20 |
|  | Specific surface area [m$^2$/g] | 1300 | 1200 | 740 | 600 |
| Acid-treated CNTs | Absorption peak [cm$^{-1}$] | 520 | 550 | 640 | 270 |
|  | Ratio of oxygen atoms [at %] | 14 | 15 | 10 | 7 |
|  | G/D ratio [—] | 0.6 | 0.6 | 0.4 | 3 |
|  | Specific surface area [m$^2$/g] | 200 | 100 | 530 | 500 |
| Dispersion liquid | Light absorbance ratio [—] | 0.8 | 0.75 | 0.4 | 0.2 |

As can be seen from Table 1, the fibrous carbon nanostructure dispersion liquids of Examples 1 and 2 where an absorption peak of acid-treated CNTs was within the wavenumber region of 500 cm$^{-1}$ to 600 cm$^{-1}$ had a high light absorbance ratio and excellent dispersibility. On the other hand, in Comparative Example 1 where the absorption peak of material CNTs and the absorption peak of acid-treated CNTs were both at a higher wavenumber than in Examples 1 and 2, it is assumed that the length of the used CNTs was shorter than in Examples 1 and 2, and dispersibility was poor. Moreover, in Comparative Example 2 where the absorption peak of material CNTs and the absorption peak of acid-treated CNTs were both at a lower wavenumber than in Examples 1 and 2, it is assumed that the length of the used CNTs was longer than in Examples 1 and 2, and dispersibility was poor.

INDUSTRIAL APPLICABILITY

According to the present disclosure, it is possible to provide a fibrous carbon nanostructure dispersion liquid having excellent fibrous carbon nanostructure dispersibility.

Moreover, according to the present disclosure, it is possible to provide a fibrous carbon nanostructure that when used in preparation of a dispersion liquid, can improve dispersibility of the obtained dispersion liquid.

The invention claimed is:

1. A fibrous carbon nanostructure having at least one absorption peak in a wavenumber region of 500 cm$^{-1}$ to 600 cm$^{-1}$ in a light absorption spectrum and having a ratio of oxygen atoms of 11 at % or more, wherein
the fibrous carbon nanostructure comprises a carbon nanotube, and
the fibrous carbon nanostructure has a G/D ratio of less than 2.0.

2. The fibrous carbon nanostructure according to claim 1, wherein
the fibrous carbon nanostructure comprises a carbon nanotube, and
the fibrous carbon nanostructure has a specific surface area of 400 m$^2$/g or less.

3. A fibrous carbon nanostructure dispersion liquid comprising:
fibrous carbon nanostructures having at least one absorption peak in a wavenumber region of 500 cm$^{-1}$ to 600 cm$^{-1}$ in a light absorption spectrum; and
a solvent, wherein
the fibrous carbon nanostructures include carbon nanotubes, and
the fibrous carbon nanostructures including the carbon nanotubes have a G/D ratio of less than 2.0.

4. The fibrous carbon nanostructure dispersion liquid according to claim 3, wherein a ratio of oxygen atoms in the fibrous carbon nanostructures is 11 at % or more.

5. The fibrous carbon nanostructure dispersion liquid according to claim 3, wherein
the fibrous carbon nanostructures include carbon nanotubes, and
the fibrous carbon nanostructures including the carbon nanotubes have a specific surface area of 400 m$^2$/g or less.

6. A method of producing a fibrous carbon nanostructure dispersion liquid comprising:
a step (A) of performing oxidation treatment of fibrous carbon nanostructures having at least one absorption peak in a wavenumber region of 200 cm$^{-1}$ to 300 cm$^{-1}$ in a light absorption spectrum; and
a step (B) of performing dispersing treatment of a mixed liquid containing acid-treated fibrous carbon nanostructures obtained through the step (A) to obtain a dispersion liquid in which fibrous carbon nanostructures having at least one absorption peak in a wavenumber region of 500 cm$^{-1}$ to 600 cm$^{-1}$ in a light absorption spectrum are dispersed.

7. The method of producing a fibrous carbon nanostructure dispersion liquid according to claim 6, wherein a ratio of oxygen atoms in the acid-treated fibrous carbon nanostructures obtained through the step (A) is 11 at % or more.

8. The method of producing a fibrous carbon nanostructure dispersion liquid according to claim 6, wherein the step (A) includes adding the fibrous carbon nanostructures into an acidic solution having a pH of 2 or lower.

* * * * *